Nov. 20, 1945. J. C. LANG 2,389,261
FASTENING NUT
Filed May 15, 1943
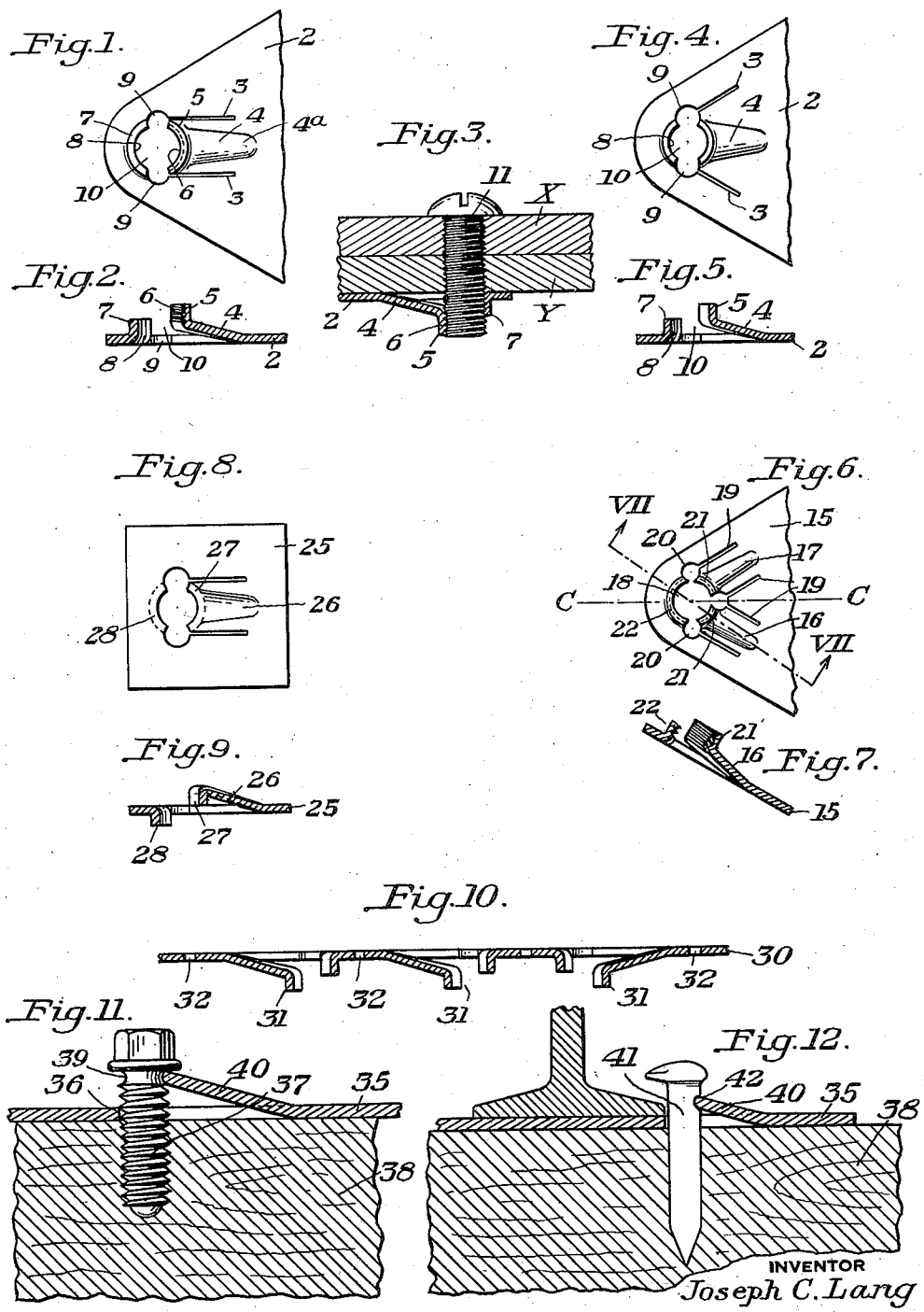
INVENTOR
Joseph C. Lang Patented Nov. 20, 1945

2,389,261

UNITED STATES PATENT OFFICE 2,389,261

FASTENING NUT

Joseph C. Lang, Pittsburgh, Pa., assignor to Bocjl Corporation, Pittsburgh, Pa., a corporation of Delaware Application May 15, 1943, Serial No. 487,093

3 Claims. (Cl. 85—32)

This invention relates to fastening devices of the type intended for use with bolts or screws or other fasteners in place of conventional nuts, and which are variously known in the art as lock nuts, sheet metal fasteners, spring nuts, and the like.

Fasteners of the type to which the present invention pertains are desirable for use in various types of plywood construction and metal and wood assemblies, as well as with sheet metal and other manufactures. They can also be made of heavy stock and used in various heavy construction. An important advantage of using them in place of conventional nuts such as are used on bolts is that, where properly used and constructed, they will not loosen under vibration, they can be applied more quickly, they may constitute an integral part of the structure to be held in place, and may have an element of resilience. Light sheet metal fasteners of this type as heretofore designed have not been suitable for use where the bolt has to be screwed down very tightly, as is necessary in plywood assemblies, because of the fact that the fastener yielded or "sprung" when drawn down past a certain point, and was thereafter relatively weak, or stripped itself from engagement with the thread of the bolt.

The present invention contemplates the provision of a fastener which is of light construction, and in which the screwing down of the bolt as tightly as possible increases the holding power of the nut. It further contemplates a fastener which may be used with spikes, lug screws, and the like.

My invention contemplates that when constructed as a nut, the fastener shall have extruded extensions for engaging the screw or bolt, at least one of said extensions being in threaded engagement with the screw or bolt, being offset in a plane above the screw or bolt, and being movable relatively to the other.

My invention may be more fully understood by reference to the accompanying drawing, in which:

Figure 1 is a top plan view of a metal body or fixture embodying a preferred form of my invention;

Figure 2 is a longitudinal vertical section through Figure 1;

Figure 3 is a view similar to Figure 2, showing the fastener cooperating with a bolt;

Figure 4 is a view similar to Figure 1, where the fastened is intended for use with a so-called "self-tapping" bolt or screw;

Figure 5 is a longitudinal vertical section through Figure 4;

Figure 6 is a top plan view of a further modification;

Figure 7 is a section along the plane of line VII—VII of Figure 6;

Figure 8 is a view similar to Figure 1 of a further modification;

Figure 9 is a longitudinal section through the modified form shown in Figure 8; and Figure 10 is a longitudinal section showing my invention applied to a strip for cooperation with several bolts.

Figure 11 shows a modification where the fastener is employed with a bolt, and Figure 12 shows a generally similar arrangement with a spike.

Referring first to Figures 1, 2, and 3, 2 designates a sheet metal body. It may be of square form, as indicated in Figure 8, strip form, as indicated in Figure 10, or it may be integrally formed as an integral part of a special piece of hardware or fitting. In Figure 1 the member 2 is illustrated as comprising one end portion of a modified oval form of base. The base has parallel slots 3 therein, forming a tongue 4. The tongue, as shown in Figure 2, is struck outwardly from the base at an obtuse angle, and the free end portion of the tongue is turned outwardly to form a lip or extrusion 5 that is curved to conform to the surface of the screw or bolt which is used with the fastener. The concave surface of this extrusion or lip is, in the modification shown in Figure 1, threaded, the threads being designated 6. Opposite the tongue 4, the edge of the metal base is turned up to provide a lip or extrusion 7. This extrusion is struck up from the metal of the base 2, and is not resilient, and in the preferred embodiment of my invention the concave surface 8 thereof is not threaded, although it may be threaded. The metal of the base is cut away at diametrically opposite points 9 to facilitate forming of the fastener from sheet metal. The two extrusions 5 and 7, while being in different planes, define a substantially circular opening 10. The tongue 4 may be and preferably is strengthened by pressing up a rib portion 4a along its length.

Figure 3 illustrates one manner of using the fastener. A bolt 11, passing through two pieces of plywood X and Y, is threaded or forced by springing tongue 4 downwardly through the fastener. Then the bolt is turned while the fastener is held stationary. The threads of the bolt engage in the threads 6 on the extrusion 5 on the tongue, and, as the turning continues, the screw action tends to pull the part 5 down toward the plane of the base. This tends to restrict the diameter of the hole 10, creating a thrust transversely of the bolt, which is resisted by the extrusion 7 at one side and the lip or extrusion 5 at the other. The tighter the bolt is screwed down, the tighter is the bolt wedged. The tongue 4, being reinforced, will resist buckling, and the tighter the bolt is turned, the more nearly will the thrust approach the center line of the tongue, but in a properly designed fastener the tongue 4 is of such length that the bolt will become jammed before the tongue can move down to the plane of the original base.

This arrangement provides a very simple lock nut, which can be easily and cheaply made from sheet stock. Threads can readily be formed at 6 without being formed on 7 through the use of a threading mandrel or anvil that is threaded along one surface only.

In Figures 4 and 5 the structure is the same as in Figures 1 and 2, and similar reference numerals have been used, but there are initially no threads 6 on the concave surface of the lip 5. If a self-threading screw or bolt, or even a wood screw is used, it will cut threads on this surface. It may also cut threads on the concave surface of 7, but 7 is, according to a preferred embodiment of my invention, hardened to resist the cutting of threads therein. Either condition may be satisfactory, but as just indicated, I presently prefer to treat 7 to resist threading.

The arrangement shown in Figures 6 and 7 follows the same general scheme, but in this modification there are two resilient tongues. In Figures 6 and 7, 15 designates the base of the sheet metal fastener, which may be of any suitable shape or size. It is provided with two outwardly struck tongues 16 and 17, one at each side of the center line C—C, and the longitudinal axes of the two tongues converge if projected at substantially the center of the hole 18. The metal is slotted at several places, as indicated at 19, to form these tongues, and cut out portions 20 aid in "forming up" the piece. Each tongue 16 and 17 has an extrusion or lip 21 thereon, the two lips together forming substantially a semi-circle around the axis of the hole 18. Symmetrical about the center line C opposite the tongues 16 and 17 is an upwardly turned lip or flange 22 on the base member.

The concave surfaces of all of the lips or flanges 21 and 22 are, in Figure 7, illustrated as being threaded, but the arrangement of Figure 1 may be used, in which only the flange surfaces on the tongues are threaded, 22 being smooth, or the parts may be formed as shown and described in Figures 4 and 5, with no threads until engaged by a self-tapping screw which may thread all surfaces or only surfaces 21. Of course, as previously indicated, flange 7 of Figure 1 may be threaded similarly to flange 22 of Figures 6 and 7, the various thread combinations herein described being interchangeably usable in all other modifications. Preferably, however, threads are formed or produced only in the flanges on the resilient tongues.

In Figures 8 and 9 the tongues are turned in the reverse direction from the forms previously described. In these figures, 25 is the base, which in this instance is shown as a simple square. It has the resilient outwardly struck tongue 26 with a lip 27, which, however, is reversely turned, so as to extend toward the plane of the base. Opposite the tongue, and struck downwardly from the base, is a lip or extrusion 28. Thread or thread-receiving surfaces as hereinbefore described may be utilized. In this arrangement there exists the same principle of operation. With this arrangement the bolt may be cut off closer to the surface of the work after it has been tightened down than with the other forms.

The form shown in Figures 8 and 9 may have any shape of base, or the base shown in any of the other figures hereinbefore described may be a simple square, depending entirely upon choice or the nature of its use.

Sometimes, as for example in assembling airplanes from plywood, it is desirable to use a strip with several fasteners integrally formed thereon. The strip may, for example, be nailed in place and then the bolts engaged therewith. Such a strip is shown in Figure 10. It comprises a base strip 30 with several fastener units 31 therealong. Each unit may have any of the specific forms, or combinations of the different forms hereinbefore described, and some may be reversed in direction to others. The strip may have nail holes 32 therein, by means of which it may be secured in place on some frame structure, or provision may be made for otherwise mounting it on a supporting frame.

My invention has its principal application to uses wherein the fastener is designed as a substitute for a conventional nut. In Figures 11 and 12 however, the fastener is used as a locking means to resist removal of a headed fastener entered into another body, and in this use it does not function as a nut. In Figure 11, my fastener comprises a plate like member 35 having an opening 36 therein through which a headed fastener, such as a bolt 37 is passed, this bolt being screwed into body 38. Under the head of the bolt is an annular recess 39 in which the tip of tongue 40 on the fastener is engaged. As the bolt is screwed down the tongue 40 exerts an increasing lateral thrust on the bolt to increase the friction on the bolt and thereby hold it against accidental removal.

In Figure 12 my fastener is the same as in Figure 11, and corresponding reference numerals have been used. In this case however, there is shown a spike, such as a rail spike 41 with a notch 42 in the shank thereof into which the tongue 40 is entered. The body of the fastener 35 may in this case be a tie plate. The function of the tongue 40 again is to tend to wedge the spike in an opening of gradually diminishing area as the tongue moves down toward the plane of the body.

In all forms of the invention, the body has a tongue constituting one side of an opening, which tongue is forced down by the bolt or spike, tending to increase the friction between the bolt or spike and the opposite side of the opening, the side toward which such thrust is exerted being itself fixed.

While I have illustrated and described several embodiments of my invention, it will be apparent that various changes and modifications may be made within the contemplation of my invention and under the scope of the following claims.

I claim as my invention:

1. A fastener of the class described comprising a base member having an opening therethrough, a tongue on the base member bent outwardly therefrom, the free end of the tongue being elevated above the base and being directed toward the opening, a thread-engaging lip on the free end of the tongue, and a lip on the base member at the edge of the opening generally opposite the tongue, said lips having concave surfaces turned toward each other, the lip on the tongue being soft so as to receive threads, the other lip being smooth and hardened to resist the action of thread-cutting means.

2. A fastener of the class described comprising a base member of sheet metal, having an opening therethrough, an integral tongue having its free end toward the opening struck outwardly and upwardly from the base member, a lip formed around a portion of the opening substantially perpendicular to the base member and opposite the tongue, and a second tongue similar to the first, the two tongues being at an acute angle to each other.

3. A fastener of the class described comprising a base member of sheet metal, having an opening therethrough, an integral tongue having its free end toward the opening struck outwardly and upwardly from the base member, a lip formed around a portion of the opening substantially perpendicular to the base member and opposite the tongue, and a second tongue similar to the first, the two tongues being at an acute angle to each other, each tongue having a lip thereon, the lips of the two tongues forming a substantially but not continuous semi-circle, and the lip on the base forming substantially but not a complete semi-circle.

JOSEPH C. LANG.